Feb. 27, 1934.  E. B. FOOTE  1,949,199
APPARATUS FOR CONTROLLING INDUSTRIAL PROCESSES
Filed Jan. 2, 1931
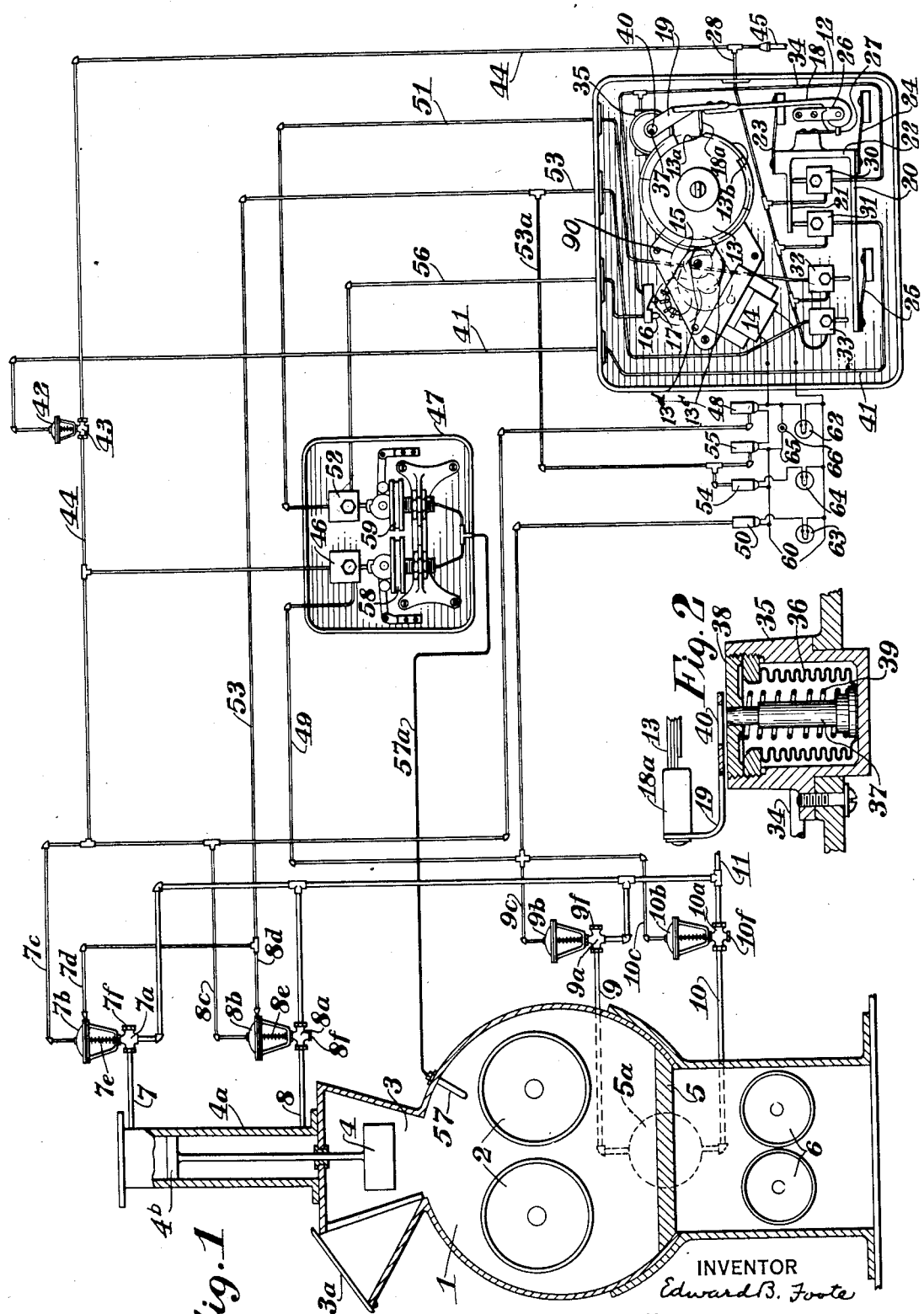

Patented Feb. 27, 1934

1,949,199

UNITED STATES PATENT OFFICE 1,949,199

APPARATUS FOR CONTROLLING INDUSTRIAL PROCESSES

Edward B. Foote, Rochester, N. Y., assignor to Taylor Instrument Companies, Rochester, N. Y., a corporation of New York Application January 2, 1931. Serial No. 506,294

6 Claims. (Cl. 161—1)

This invention relates to apparatus for carrying out an industrial process in accordance with a definite time schedule and more in particular to apparatus including a cam having a composite surface representing a definite time schedule and a follower in contact with the cam for operating a plurality of translating devices.

In apparatus of this type a constant speed motor as the equivalent of a time piece is used to rotate the cam at a relatively slow speed until the cycle of operation is concluded and a second motor is then set into motion for rapidly continuing the rotation of the cam until the cam and the follower are again in the same relative position as at the beginning of the cycle, to be ready for the next cycle.

Due to the nature of the cam surface and the translating devices it is desirable and in most cases necessary that the cam and the follower be always placed in exactly the same starting position. Due, on the other hand, to the relatively high-speed motion of the cam on its return to the starting position, which high-speed motion is desirable in order to save time, there is no certainty that the cam will come to rest in the desired position.

The present invention has for its object to provide mechanism for controlling the relative movement of the cam and the follower so as to make the final position of the cam and the follower coincide with the starting position.

The invention, briefly expressed, comprises means responsive to the movement of the cam for holding the cam and the follower against relative movement when the cam and the follower have reached a definite relative position.

In order to afford a full understanding of the invention and its mode of operation, reference is made to the drawing, wherein Fig. 1 is a schematic view of apparatus for controlling the operation of a machine for preparing rubber stock for vulcanization, including the invention; and Fig. 2 is an enlarged sectional view showing the most essential part of the invention.

In the drawing 1 is a mixing chamber containing the rolls 2 which may be driven by any suitable power plant not material to the invention. Above the mixing chamber is a feed hopper 3 together with a plunger 4 for forcing the material into contact with the rolls 2. At the bottom of the mixing chamber is provided a slide gate 5 and below the gate are disposed rolls 6 for discharging the material in the form of a sheet or wide ribbon for further treatment. The plunger 4 carries at its upper end a piston $4b$ preferably operated by pneumatic pressure in a pressure cylinder $4a$ and the gate 5 is similarly operated by means of a pneumatic cylinder $5a$ located at the far side of the mixing chamber when looking at the drawing. The cylinder $4a$ is connected at opposite ends to compressed air pipes 7 and 8 and the cylinder $5a$ is similarly connected to compressed air pipes 9 and 10.

The rolls 2 are preferably continuously driven. A charge of rubber stock is first charged into the hopper through the door $3a$, the slide gate 5 being initially in closed position. The plunger 4 is then pressed down to continuously force the stock into engagement with the roller until the stock has been thoroughly broken up and is ready for the mixing operation proper. The plunger 4 is then retracted to permit the charge of materials to be added. After this charge has been entered, the plunger is again forced down as before and the mixing operation is carried on until it is completed. At any rate, the mixing operation is stopped when the temperature in the mixing chamber reaches a predetermined limit, when the slide gate 5 is opened and the plunger is retracted to its upper position. The stock is then discharged. When the temperature in the mixing chamber has dropped to a certain lower limit, the gate 5 is again closed, it being understood that this temperature limit is so chosen that, according to experience, all the stock has left the mixing chamber. The apparatus is then ready for a new cycle of operation.

The compressed air pipes 7, 8, 9 and 10 are controlled by valves $7a$, $8a$, $9a$ and $10a$, respectively, which in turn are operated by diaphragm tops $7b$, $8b$, $9b$ and $10b$, respectively. Of these, diaphragm tops $9b$ and $10b$ have each a single diaphragm actuated by compressed air admitted through pipes $9c$ and $10c$, respectively. Diaphragm tops $7b$ and $8b$, on the other hand, have each two diaphragms spaced from one another and separably operable. In the top $7b$ the upper diaphragm is actuated by air conducted through pipe $7c$ and the lower diaphragm is actuated by air flowing through pipe $7d$. In top $8b$, the upper diaphragm is actuated by air entering through pipe $8c$ and the lower diaphragm is acted upon by air admitted through pipe $8d$. As is well known, both diaphragms are connected to the valve rod $7e$ and $8e$, respectively.

Compressed air for the operation of the cylinders $4a$ and $5a$ is conducted to the valves $7a$, $8a$, $9a$ and $10a$ from a supply pipe 11. The valves are three-way valves having exhaust ports $7f$, 8f, 9f and 10f, respectively. In one position of the valves, air flows from the supply into the cylinders and in the other position air exhausts from cylinders into the atmosphere. It is understood that when one end of a cylinder is under pressure, the other is connected to the corresponding exhaust port.

The principal part of the operating mechanism is a control device 12 containing a cam 13 having a composite surface including an incline 13a, the first concentric portion 13b, a second incline 13c and a second concentric portion 13d. The control device further includes a constant speed motor 14 of usual construction functioning through a suitable gear train 90 to drive the cam; a separate motor including preferably a turbine wheel 15 and compressed air nozzles 16 and 17 for driving said cam; a follower 18 having at its upper end a finger 18a for engagement with the cam surface and a locking device to be more fully described and a plurality of valves actuated by arms 20 and 21 of a frame moved by the follower 18. The frame 22 is suspended on leaf springs 23, 24 and 25 for parallel motion and carries at one side knife edge 26 or the like for engagement with a heel 27 at the lower pivoted end of the follower 18. Pivotal motion of the follower causes the frame 22 to rise or fall whereby arms 20 and 21 press upon the valve stems of valves 30, 31, 32, 33 to open the valves or move away from the same to allow the valves to close, as the case may be. Compressed air is conducted to one side of the valves by means of a conduit 28.

From valve 30 a connection 34 leads to the interior of a housing 35 as shown in detail in Fig. 2 and to the nozzle 17. Within the housing 35 is mounted an expansible diaphragm 36 closed at one end and with its open end in air tight connection with the wall of the housing. Within the diaphragm 36 is disposed a stud 37 one end of which is in contact with the closed end of the diaphragm and the other end of which extends through an aperture in a plate 38 which forms one wall of the housing. A spring 39 bearing at one end against the inner side of the plate 38 and at its other end against the opposite end of stud 37 forces the latter to remain in contact with the closed end of the diaphragm and to move with the latter. When air is admitted to interior of the housing 35, the diaphragm is compressed and the free end of the stud 37 is caused to project outside the plate 38. The locking device 19, previously referred to, has at its upper end an aperture 40 in axial alignment with the stud 37.

The outlet side of valve 31 is connected by means of a conduit 41 to the diaphragm top 42 of a valve 43 which controls a conduit 44 connected with the conduit 28 to a pressure reducer 45. The conduit 44 leads to the pipes 7c and 8c, to valve 46 of a temperature-sensitive device 47 to be more fully described, and to a pneumatic switch 48. The outlet side of valve 46 is connected by means of a conduit 49 to the diaphragm tops 9b and 10b and to a pneumatic switch 50.

The outlet side of valve 32 is connected by means of conduit 51 to valve 52 of the temperature-sensitive device 47, the outlet side of valve 52 being connected by means of conduit 56 to nozzle 16. Nozzle 17 is connected to conduit 34, as mentioned.

The outlet side of valve 33 is connected by means of conduit 53 to the pressure chambers of the lower diaphragms of diaphragm tops 7b and 8b and a connection 53a leads from conduit 53 to the upper end of a pneumatic switch 54 and to the lower end of a pneumatic switch 55.

Suitably disposed within the mixing chamber 1 is a temperature-sensitive bulb 57 connected by means of a capillary 57a to two capsular diaphragms 58 and 59 which operate the valves 46 and 52, respectively.

The motor 14, in the particular instance, is a synchronous motor of well known type and is operated by an electric circuit 60. The pneumatic switches 48, 50 and 54 interconnect the opposing sides of the circuit through lights 62, 63 and 64. Pneumatic switch 55 bridges the gap in one side of the circuit and therefore, when open, cuts out the motor 14. A connection 65, bridges switches 55 and 48, when the push button 66 is closed, but the latter is normally open and closed only when it is desired to start the cycle of operation, switches 55 and 48 being automatically operated to make or break the circuit.

In the following description, reference will be made to "direct acting" and "reverse-acting" valves and switches. The former term is generally used to designate valves and switches which are moved to closing position by application of a force (air in the present case) and moved to open position under the action of a spring when the force (air) is cut off. The latter term, on the other hand, denotes such valves and switches which are normally closed and held in closed position by a spring and are moved to open position by the application of a force (air in this case).

Valves 7a and 9a and switches 50 and 54 are "direct acting", while valves 30, 31, 32, 33, 46, 52, 8a, 10a and 43 and switches 48 and 55 are "reverse-acting".

The operation is as follows:

The cylinders 4a and 4b and all the valves and diaphragms and the nozzles 16 and 17 are operated by compressed air from the same source. By means of the reducer 45 the air pressure is reduced to a pressure suitable for the operation of the diaphragms. While there is a great deal of latitude in this respect, I propose to use for the operation of the plunger 4 and the gate 5 a pressure of about 85 lbs. and for the operation of the diaphragms, etc., a pressure of about 25 lbs.

The cycle of operation begins with the position of the cam 13 and the follower 18 as indicated in Fig. 1. The finger 18a is in a position about half way up the incline 13a. The gate 5 is closed and the plunger is up. The operator fills the hopper 3 with the initial material. When the hopper is filled, the operator pushes the button 66 to start the motor 14 and the cam begins to rotate in counter-clockwise direction. As soon as the finger 18a has advanced slightly further up the incline 13a, the valve 31 is allowed to close, thereby cutting the air from the diaphragm top 42 of valve 43, with the result that the latter closes and cuts off the air, in the first instance from the switch 48 allowing the same to close. The switch 55 being also closed, the motor circuit is automatically closed by the closing of switch 48 and the push button can be released. At the same time, the air is cut off from the diaphragm tops of the valves 7a and 8a causing the former to open and the latter to close with the result that the plunger 4 is forced down. With the closing of the switch 48, the light 62 is energized indicating by its color, say white, that the operation is under way. The cam continues to move until the finger reaches a point part way up the incline 13c. The cam, which in practice is made in sections, as appears in the drawing particularly Fig. 2, may be adjusted for any desired period of time for the operation. At the present time, the minimum period is about one and one-half minutes and the maximum period about three minutes from the beginning of the operation until the finger 18a reaches the incline 13c.

During this period, the air is also cut-off from valve 46, the significance of which will appear later on.

As soon as the finger 18a has reached a position slightly more than half-way up the incline 13c, the arm 20 has pressed against the stems of valves 32 and 33 to open them. From valve 33 air now flows to the switches 54 and 55, the former closing and energizing the light 64, which may be red for instance, and the latter opening to stop the motor 14. As the same time air flows through conduits 53 to the lower diaphragm of the tops 7b and 8b, causing valve 7a to close and valve 8a to open with the result that the plunger 4 is again raised.

From the valve 32 air flows through conduit 51 to the valve 52. However, this valve is closed and remains closed until the temperature in the mixing chamber 1 reaches a certain temperature limit (about 150° F.) at which limit the diaphragm is sufficiently expanded to open valve 52.

Now the operation is stopped until the operator has charged into the mixing chamber the additional ingredients and again pushes the button 66. Now the motor starts again and the cam 13 continues its movement. The finger 18a moves up the remaining part of the incline 13c and then drops back to the concentric portion 13d and continues on the latter until the temperature in the mixer has reached the critical limit. When the finger 18a drops from the top of the incline 13c to the concentric portion 13d, valve 33 closes again, releasing the air from the lower diaphragms of tops 7b and 8b, whereby the plunger 4 is again lowered, and from the switches 54 and 55 whereby the light 64 is extinguished and the motor circuit 60 automatically opened. Valve 32 remains open supplying air to the valve 52.

As soon as the critical temperature in mixer is reached, the valve 52 opens and furnishes air to the nozzle 16 causing a rapid movement of the cam in the same direction to quickly advance the cam to the initial position.

When the finger 18a drops down from the concentric portion 13d to the foot of the incline 13a, valves 32 and 33 are closed, but valves 30 and 31 are opened. The closing of valve 32 shuts off the air from the nozzle 16. Valve 31 supplies air to the diaphragm top 42 of valve 43 to open the latter whereby the valves 7a and 8a are operated to raise the plunger and valves 9a and 10a are operated to open the slide gate 5 and the switch 50 is closed to energize the light 63 which may be green for instance, to show the completion of the cycle. At the same time valve 30 supplies air to the nozzle 17 to continue the rotation of cam 13 and to the housing 35. The air pressure within the housing 35 compresses the diaphragm 36 and causes the stud 37 to project through the opening in plate 38 into the opening 40 in the locking member 19. Opening 40 is larger than the projecting part of the stud 37 and is so disposed that as the finger 18a rides up the incline 13b, the edge of the opening 40 (which appears to the left of the stud 37 in Fig. 1 and to the right of the stud in Fig. 2) comes into contact with the stud just as the finger 18a reaches the starting position shown in Fig. 1, whereby the follower 18 and the finger 18a are held against further movement. As the finger 18a approaches the particular position mentioned, the valve 30 is closed and air is cut off from the nozzle 17, but it is uncertain just how quickly the wheel 15 would stop and where the finger 18a would come to rest. Likewise valve 30 cuts off air from housing 35 and in due time diaphragm 36 retracts stud 37 from the opening 40 in the locking member 19 on the follower. This last-named operation takes place after the finger 18a and the cam 13 have come to the desired position of rest. The purpose of the locking mechanism is to precisely fix the position of the finger 18a for the starting of the next cycle.

The closing of valve 33 shuts off the air from the lower diaphragm of valve tops 7b and 8b at the same time the air is shut off from the upper diaphragms, so that the valves 7a and 8a may reverse their positions. At the same time the air is shut off from switches 54 and 55 to stop the motor 14 and extinguish light 64.

Air was admitted to valve tops 9b and 10b through valve 46 which was open due to the expansion of capsular diaphragm 58. However, when the temperature in the mixing chamber drops to a certain limit, say 120° F., the valve 46 closes again and shuts off air from the valve tops 9b and 10b allowing the valves 9a and 10a to reverse their relative position to close the gate again.

As was previously mentioned, during the first part of the operation, i. e. the break-down operation of the rubber, the air is cut off from the valve 46 by the valve 43. Even if the temperature should reach or exceed the critical limit of 150° F. to open the valve 46, no air would flow to the diaphragm tops of valves 9b and 10b to open the gate 5. Similarly no air can flow to either of the nozzles 16, 17 to prematurely return the cam to the initial position, because no air is admitted to the valve 52 until after the first part of the cycle is completed and air can flow to the nozzle 17 only when the cam approaches the final position.

In the foregoing I have described the complete operation of a particular kind of apparatus to properly qualify the invention in a concrete setting. The mixing mill and the control device, generally, do not form a part of the invention. The invention proper comprises the mechanism shown in Fig. 2, together with the valve 30 and their operative relation to other elements principally the cam, the follower, the wheel 15 and nozzle 17.

It is understood that the use of a pressure fluid for operating the stud 37 merely represents one convenient means particularly suggested in connection with the apparatus described.

While I have shown a pin as a movable abutment for interlocking engagement with the follower, the nature of the abutment, its motion and the interlocking engagement may vary in various ways and the interlocking action is by no means limited to the follower. My invention contemplates any construction whereby the cam and the follower are held against relative movement when a definite relative position of the cam and the follower is reached.

The present application is related to the following copending applications: E. B. Foote, Ser. No. 464,099, filed June 26, 1930, now Patent No. 1,921,740, issued Aug. 8, 1933; E. B. Foote et al., Ser. No. 464,100, filed June 26, 1930, now Patent No. 1,921,741, issued Aug. 8, 1933.

I claim:

1. In apparatus of the character described, the combination with a cam having a composite surface representing a definite time schedule and a follower positioned to contact with the cam surface, of means for driving the cam at a relatively slow speed from an initial definite relative position of the cam and the follower through part of one revolution, means for driving the cam at a relatively high speed through the remaining part of one revolution, means for de-energizing the high speed driving means when the cam substantially reaches its initial position and means operative to hold the cam and the follower against relative movement when said initial position is reached.

2. Apparatus according to claim 1, including means responsive to the movement of the cam for energizing the said cam and follower holding means when the cam approaches said definite position and for de-energizing the same when the said definite position is reached.

3. In apparatus of the character described, the combination with a cam, a follower contacting with the cam, means for rotating the cam and means for holding the cam and the follower against relative movement in a definite relative position, including a portion of the follower having a perforation, a pin movable at right angles to the plane of motion of the follower into and out of said perforation and means responsive to the movement of the cam for actuating the pin.

4. In apparatus of the character described, a regulating mechanism for terminating the operation of a device in one stage of its cycle of operation in accordance with the expiration of a predetermined time interval and in another stage of its cycle in accordance with temperature, said regulating mechanism including timing means to measure said predetermined interval of time, and means operative responsive to a predetermined temperature to accelerate the speed of operation of said timing means.

5. In apparatus of the character described, a regulating mechanism for terminating the operation of a device in one stage of its cycle of operation in accordance with the expiration of a predetermined time interval and in another stage of its cycle in accordance with temperature, said regulating mechanism including time means to measure said predetermined interval of timing, and means operative responsive to a predetermined temperature to control the speed of operation of said timing means.

6. In apparatus of the character described, the combination with a cam having a composite surface representing a definite time schedule, a motor for driving the cam, a follower positioned to contact with the cam surface and translating mechanism for cooperation with the follower, of means operatively connected with the follower for de-energizing the motor when the cam and the follower approach a definite position relatively to one another, and means operatively connected with the follower for holding the cam and the follower against relative movement when said definite relative position is reached, said means for holding the cam and the follower against relative movement including means responsive to the movement of the cam for making the holding means effective when the cam approaches said definite position and for making it ineffective when said position is reached.

EDWARD B. FOOTE.